United States Patent
Hung et al.

(10) Patent No.: US 9,853,447 B2
(45) Date of Patent: Dec. 26, 2017

(54) ACTIVE DROOP CURRENT SHARING AMONG POWER SUPPLY UNITS

(71) Applicant: Dell Products L.P., Round Rock, TX (US)

(72) Inventors: Tsai-Fu Hung, Hsin-Dain (TW);
Shih-Chieh Wang, Taipei (TW);
Yi-Chiao Hsu, New Taipri (TW);
Chung-Fu Lai, Sanchong (TW)

(73) Assignee: Dell Products L.P., Round Rock, TX (US)

( * ) Notice: Subject to any disclaimer, the term of this patent is extended or adjusted under 35 U.S.C. 154(b) by 482 days.

(21) Appl. No.: 14/534,317

(22) Filed: Nov. 6, 2014

(65) Prior Publication Data

US 2016/0134108 A1    May 12, 2016

(51) Int. Cl.
*H02J 7/34* (2006.01)
*H02J 1/10* (2006.01)
*H02J 3/38* (2006.01)
*H02J 1/04* (2006.01)
*G06F 1/26* (2006.01)

(52) U.S. Cl.
CPC .................. *H02J 1/04* (2013.01); *G06F 1/26* (2013.01); *H02J 1/102* (2013.01); *Y02P 80/11* (2015.11)

(58) Field of Classification Search
CPC ... H02J 1/04; H02J 1/102; Y02P 80/11; G06F 1/26
USPC .......................................................... 307/60
See application file for complete search history.

(56) References Cited

U.S. PATENT DOCUMENTS

| | | | |
|---|---|---|---|
| 5,757,634 A * | 5/1998 | Ferens | H02M 7/493 363/41 |
| 6,894,466 B2 | 5/2005 | Huang et al. | |
| 7,541,793 B2 | 6/2009 | Saeueng et al. | |
| 9,000,616 B2 * | 4/2015 | Greene | H02J 1/10 307/82 |
| 2003/0048648 A1 * | 3/2003 | Lin | H02M 3/1584 363/65 |
| 2006/0239046 A1 * | 10/2006 | Zane | H02M 3/1584 363/65 |
| 2012/0319490 A1 * | 12/2012 | Adest | G01S 3/7861 307/77 |
| 2013/0026832 A1 * | 1/2013 | Lee | H02J 1/10 307/43 |
| 2013/0249519 A1 * | 9/2013 | Zhao | G05F 1/46 323/284 |
| 2014/0049108 A1 * | 2/2014 | Hsu | H02J 3/06 307/52 |

(Continued)

OTHER PUBLICATIONS

Voltage droop from Wikipedia, the free encyclopedia, printed Nov. 5, 2014, 2 pages.

*Primary Examiner* — Jared Fureman
*Assistant Examiner* — Esayas Yeshaw
(74) *Attorney, Agent, or Firm* — Baker Botts L.L.P.

(57) ABSTRACT

Active droop current sharing among power supply units may regulate output currents of power supply units supplying shared current to a common load. The regulation may employ a combination of droop control and active current control. The shared current may be regulated such that each power supply unit provides a substantially equal share of the total current supplied. A current difference between two power supplies may be regulated to be within a desired maximum threshold for current difference.

20 Claims, 7 Drawing Sheets

(56) References Cited

U.S. PATENT DOCUMENTS

| | | | |
|---|---|---|---|
| 2014/0067149 A1* | 3/2014 | Chen | H02J 5/00 700/295 |
| 2014/0277277 A1* | 9/2014 | Gordon | A61N 1/378 607/59 |
| 2015/0091915 A1* | 4/2015 | Hurd | G06F 9/38 345/506 |
| 2015/0222183 A1* | 8/2015 | Karlsson | H02M 3/156 323/271 |

* cited by examiner

ACTIVE DROOP CURRENT SHARING AMONG POWER SUPPLY UNITS

BACKGROUND

Field of the Disclosure

This disclosure relates generally to information handling systems and more particularly to active droop current sharing among power supply units.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may process, store, and communicate information and may include one or more computer systems, data storage systems, and networking systems.

In various information handling systems, power supplies are used to provide constant and reliable power. In many configurations, multiple power supplies may provide power to an information handling system. Sharing of electrical loads, such as from information handling systems, among power supplies may be subject to inefficiency and losses, among other disadvantages.

SUMMARY

In one aspect, a disclosed method for active droop current sharing may involve switching a load to a first power supply and to switching the load to a second power supply. Responsive to switching the load to the first power supply and to switching the load to the second power supply, the method may include activating droop control of a first current supplied by the first power supply and a second current supplied by the second power supply. The method may further include detecting that the first current is stable within a tolerance over a time period and that the second current is stable within the tolerance over the time period. Responsive to detecting that the first current and the second current are stable and that a current difference between the first current and the second current is greater than a first maximum threshold, the method may further include regulating the first current and the second current using active current control to reduce the current difference to correspond to the first maximum threshold.

Other disclosed aspects include a power supply unit including a first direct current (DC) power converter supplying a first current at an output voltage, a first mixer to generate an active current control feedback signal associated with active current control of the first current, a second mixer to generate a droop control feedback signal associated with droop control of the first current, and a master/slave determination unit to generate an external current sharing signal indicative of the first current when the first current is greater than a second current supplied by a second DC power converter, and to receive an external current sharing signal indicative of the second current when the first current is less than the second current. Another disclosed aspect is a power supply unit comprising a processor having access to a memory storing instructions executable by the processor to implement active droop current sharing.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
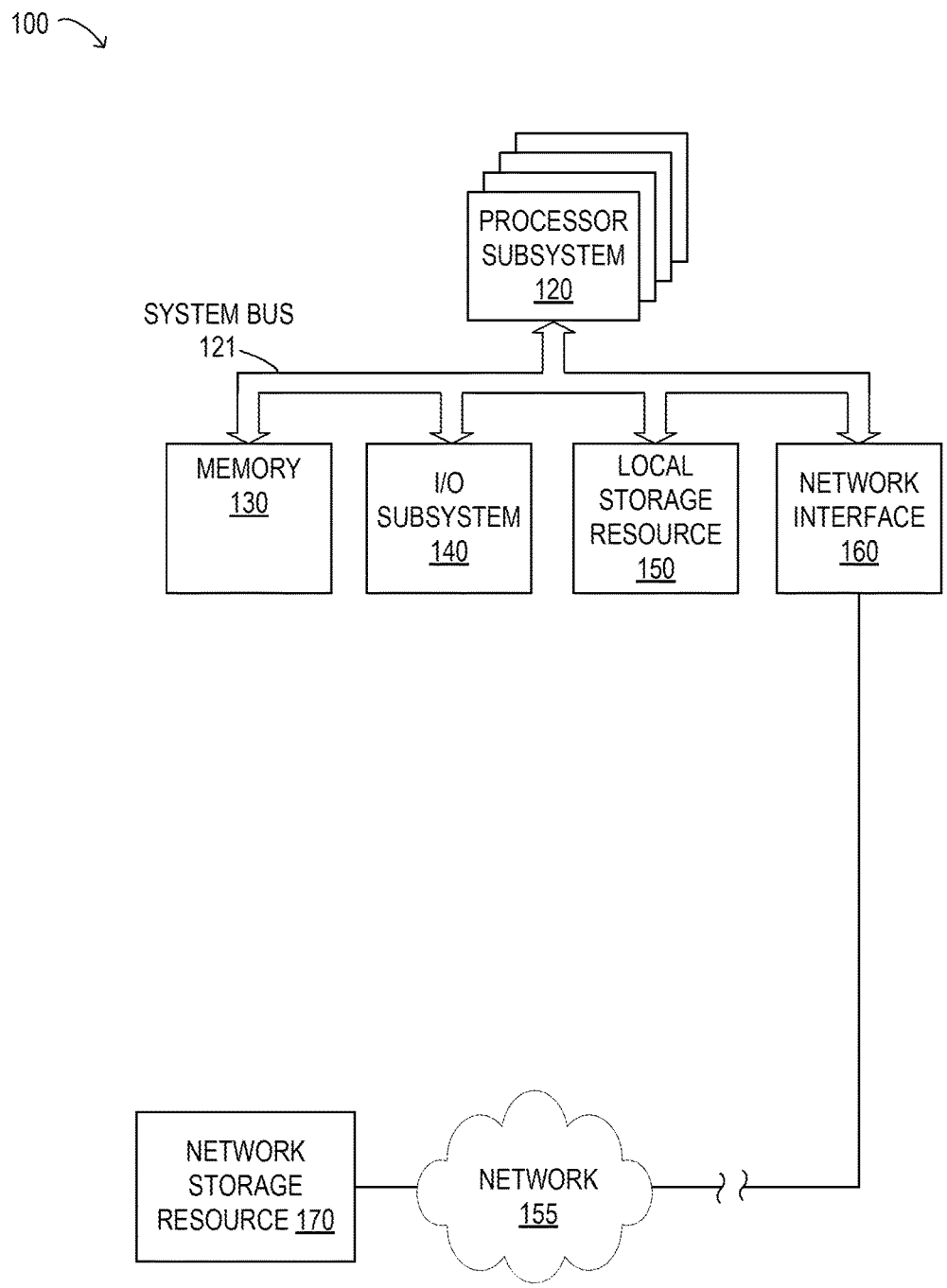
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, or subsystem 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of physical hardware 102). In the same or alternative embodiments, processor subsystem 120 may interpret and/or execute program instructions and/or process data stored remotely (e.g., in a network storage resource).

Also in FIG. 1, memory subsystem 130 may comprise a system, device, or apparatus operable to retain and/or retrieve program instructions and/or data for a period of time (e.g., computer-readable media). As shown in the example embodiment of FIG. 1, memory subsystem 130 stores user-personalized wake policy 132, which may represent instructions executable by processor subsystem 120 to implement the methods described herein. It is noted that in different embodiments, user-personalized wake policy 132 may be stored at network storage resource 170 and may be accessed by processor subsystem 120 via network 155 Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In FIG. 1, local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory subsystem 130 for execution, such as user-personalized wake policy 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel (not shown) may include circuitry for enabling touch functionality in conjunction with a display (not shown) that is driven by display adapter (not shown).

As will be described in further detail, information handling system 100, or certain components included therein, may be supplied power by one or more power supply units. As used herein, "supplying power" to a load may include sourcing or draining current to the load at a given voltage or at a regulated voltage. The current and voltage may be regulated by the power supply units depending on a power consumed by the load at a certain time. For example, powered components associated with the load may drain a certain amount of current at a certain time. When the load is information handling system 100 or certain components included therein, the power supply units may supply current to power processor subsystem 120, memory subsystem 130, I/O subsystem 140, local storage resource 150, etc. Thus, current supplied by the power supply units may change according to changing operational conditions of information handling system 100. An immediate change in a current flowing through the load may be referred to herein as "switching" of the load. For example, switching a load to a power supply may involve galvanically connecting (or disconnecting) the load to the power supply, such as with an electrical switch or a relay. As used herein, switching a load may also refer to a sudden change in current supplied to the load. The sudden change in current may involve an increase or a decrease of the current, or may involve reversing a direction of the current flow, for example, from sourcing to draining. In certain embodiments, the power supply units disclosed herein may be switched to loads that include a plurality of information handling systems, for example, such as in a rack domain or a data center.

Figure 2A:
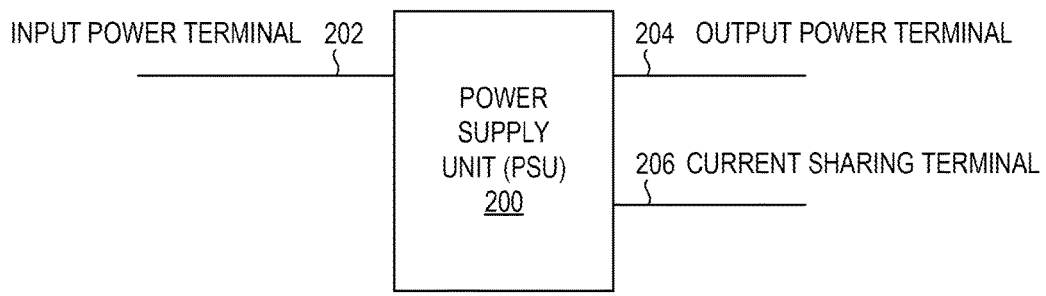
FIG. 2A is a block diagram of selected elements of an embodiment of a power supply unit.

Referring now to FIG. 2A a block diagram of selected elements of exemplary power supply unit 200 is illustrated. FIG. 2A is a schematic illustration and is not drawn to scale. In FIG. 2A, ground connections are omitted for descriptive clarity. As shown, power supply unit 200 has an input power terminal 202, an output power terminal 204, and a current sharing terminal 206. In particular embodiments, power supply unit 200 may have other input or output terminals. Power supply unit 200 may be used to supply power to information handling system 100.

In FIG. 2A, input power terminal 202 may be coupled to any suitable source of power for supplying power to power supply unit 200. For example, when power supply unit 200 is supplied with alternating current (AC) power, input power terminal 202 may be coupled to an AC power source. When power supply unit 200 is supplied with direct current (DC) power, input power terminal 202 may be coupled to a DC power source. AC power sources may be in the range of 90-264 VAC, while DC power sources may be in the range of 5-240 VDC.

In FIG. 2A, output power terminal 204 may supply output power to a load, such as load 210 in FIG. 2B below. For example, output power terminal 204 may be coupled to information handling system 100 and may supply information handling system 100 with an output current at an output voltage. The output voltage at output power terminal 204 may be any suitable voltage. For example, the output voltage may be stepped down from the source voltage applied at input power terminal 202. The output voltage may be approximately the same as the source voltage applied at input power terminal 202. The output voltage may be a voltage commensurate with a particular load, such as a load suitable for electronic components. Furthermore, the output voltage may be regulated to be within a desired voltage tolerance. For example, when input power terminal 202 experiences a relatively wide voltage variation (e.g., ±25%), the output voltage at output power terminal 204 may be regulated to be within a narrower tolerance (e.g., ±5%).

In certain embodiments, power supply unit 200 in FIG. 2A may supply power to the load jointly with one or more other power supply units. For example, the load may be coupled to output power terminal 204 of power supply unit 200 and simultaneously coupled to another output power terminal of a second power supply unit. Using multiple power supply units, an output voltage at output power terminal 204 of each power supply unit may be approximately the same, while an individual current respectively supplied at output power terminal 204 by each power supply unit may be combined to supply the load with a sum of the individual currents, which is referred to herein as "current sharing".

In certain embodiments of current sharing, it may be desirable that each power supply unit supply an equal portion of current as other power supply units coupled to the same load. Such equal or balanced current sharing may be advantageous for many reasons. For example, two power supply units each supplying a load with 5 Amperes (5 A) using equal or nearly equal current sharing may operate more efficiently or at a lower temperature than one power supply unit supplying the load with 10 A without current sharing. In the same example, a first power supply unit supplies the load with 7 A and a second power supply unit supplies the load with 3 A using unequal current sharing. Using unequal current sharing may also result in operation of a power supply unit at a lower efficiency or a higher temperature than is desired. Higher efficiency and lower temperatures may result in lower operational losses and improved service lifetimes of the equipment or the components used in the power supply units.

A "current difference" may be calculated as a difference in current supplied respectively by each of two power supply units using current sharing. Accordingly, in a current sharing arrangement comprising two or more power supply units coupled to a common load, the current difference may be a parameter subject to regulation. For example, a current sharing system may regulate (or attempt to regulate) a current difference of zero where each power supply unit operating under current sharing supplies an equal portion of the total current being supplied. In certain embodiments, the regulation of current sharing among a plurality of power supply units may include specifying a maximum threshold of the current difference that is desired or allowable. Current differences and maximum thresholds for current differences may be expressed in terms of total current, such as a percentage. For example, a current sharing system with two power supply units supplying 100A of total current to a load may have a 0% current difference when both a first and a second power supply unit each supply 50A. The current sharing system may have a 10% current difference when the first power supply unit supplies 45A and the second power supply unit supplies 55A. The current sharing system may have a 4% current difference when the first power supply unit supplies 52A while the second power supply unit supplies 48A.

As shown in FIG. 2A, to facilitate current sharing with additional power supply units, power supply unit 200 includes current sharing terminal 206. Current sharing terminal 206 may be used to propagate a current sharing signal indicative of current being supplied at output power terminal 204 of power supply unit 200. In various embodiments, the current sharing signal propagated by current sharing terminal 206 may be an analog signal or a digital signal. Additionally, current sharing terminal 206 may receive the current sharing signal indicative of current being supplied at an output power terminal of another power supply unit. In this manner, the current sharing signal provided or received at current sharing terminal 206 may facilitate coordination between multiple power supply units in supplying an equal amount of current to a load in a current sharing system, as is described in more detail below.

Figure 2B:
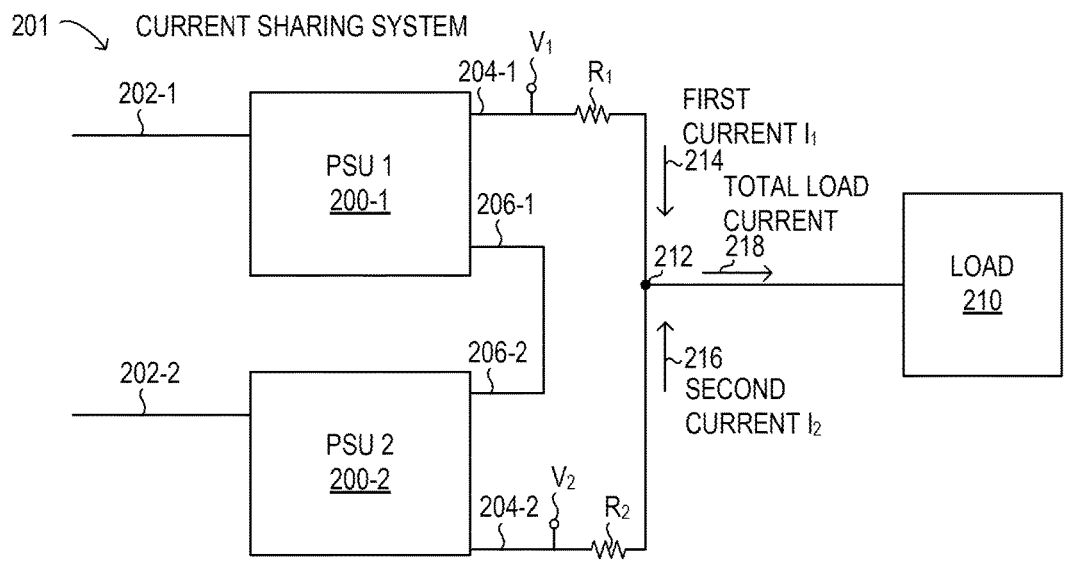
FIG. 2B is a block diagram of selected elements of an embodiment of a current sharing system.

Referring now to FIG. 2B, selected elements of an embodiment of current sharing system 201 comprising two power supply units 200-1 and 200-2 are illustrated. FIG. 2B is a schematic illustration and is not drawn to scale. In FIG. 2B, ground connections are omitted for descriptive clarity. Power supply units 200-1 and 200-2 may receive power from one or more external sources (not shown) at respective input power terminals 202-1 and 202-2. The input power terminals 202 may receive input power from a common source or from different sources. As shown, power supply units 200-1 and 200-2 respectively supply power to load 210 from output power terminals 204-1 and 204-2. Power supply unit 200-1 supplies first current $I_1$ 214 at output voltage $V_1$ and power supply unit 200-2 supplies second current $I_2$ 216 at output voltage $V_2$. As shown, output power terminals 204-1 and 204-2 are coupled through respective distribution resistors $R_1$ and $R_2$ to shared output node 212. At shared output node 212, first current $I_1$ 214 combines with second current $I_2$ 216 to form total load current 218. It is noted that directions of first current $I_1$ 214, second current $I_2$ 216, and total load current 218 are arbitrarily chosen for descriptive clarity and may be different in various embodiments. Output node 212 is coupled with load 210 such that load 210 is supplied with power comprising total load current 218. As shown, current sharing terminal 206-1 of power supply unit 200-1 is coupled with current sharing terminal 206-2 of power supply unit 200-2.

In various embodiments, certain components of power supply units 200-1 and 200-2 may not be perfectly matched or aligned with each other. For example, components from different manufacturers may have unmatched output impedances or other misaligned characteristics. Misalignment between components of power supply units 200-1 and 200-2 may inhibit equal current sharing in various ways. For example, if output power terminals 204-1 and 204-2 were directly coupled together such that $V_1$ and $V_2$ were identical (not shown), the imperfect alignment of components in power supply units 200-1 and 200-2 could result in unequal currents, undesired output voltages, or other issues detrimental to equal current sharing. Accordingly, to achieve equal or substantially equal current sharing, output power terminals 204-1 and 204-2 may be coupled together through distribution resistors $R_1$ and $R_2$ so as to be able to output power at distinct voltages $V_1$ and $V_2$. While $V_1$ and $V_2$ may be distinct and independent, $V_1$ and $V_2$ may also be similar. For example, $V_1$ and $V_2$ may both be within 300 mV of a nominal voltage such as 12.00 VDC.

Supplying power with similar but independent output voltages $V_1$ and $V_2$ may facilitate equal or substantially equal current sharing. For example, power supply unit 200-1 may detect that first current $I_1$ 214 is lower than second current $I_2$ 216. In response, power supply unit 200-1 may slightly increase $V_1$, which may in turn slightly increase first current $I_1$ 214. Because distribution resistors $R_1$ and $R_2$ allow $V_1$ to change independently from $V_2$, power supply unit 200-2 may maintain $V_2$ at a constant level. The increase in first current $I_1$ 214 may cause first current $I_1$ 214 to supply a higher percentage of total load current 218. Consequently, second current $I_2$ 216 may slightly decrease to supply a lower percentage of total load current 218. In this manner of regulation, a current difference between first current $I_1$ 214 and second current $I_2$ 216 may be reduced and the current sharing between power supply units 200 may become more equal. It is noted that current sharing system 201 may allow $V_1$ and $V_2$ to be similar but independent in any suitable way. For example, as shown, distribution resistors $R_1$ and $R_2$ may be discrete. In other embodiments, output power terminals 204-1 and 204-2 may be coupled to shared output node 212 using other arrangements of current distribution to enable current sharing.

Current sharing terminals 206 may facilitate coordination between power supply units 200-1 and 200-2 for current sharing. For example, when first current $I_1$ 214 is greater than second current $I_2$ 216, power supply unit 200-1 may output a current sharing signal indicative of first current $I_1$ 214 on current sharing terminal 206-1 and power supply unit 200-2 may receive the current sharing signal on current sharing terminal 206-2. The current sharing signal may direct power supply unit 200-2 to regulate $V_2$ such that second current $I_2$ 216 is increased. Later, if second current $I_2$ 216 becomes greater than first current $I_1$ 214, power supply unit 200-2 may, in turn, output the current sharing signal indicative of second current $I_2$ 216 on current sharing terminal 206-2 and power supply unit 200-1 may receive the current sharing signal on current sharing terminal 206-1, such that the current sharing signal directs power supply unit 200-1 to regulate $V_1$, for example by increasing first current $I_1$ 214. It is noted that one or more additional power supply units may also cooperate in current sharing (not shown). For example, respective output power terminals of the additional power supply units may be coupled to shared output node 212 through respective distribution resistors. Respective current sharing terminals of the additional power supply units may likewise be coupled to current sharing terminals 206-1 and 206-2.

Figure 3:
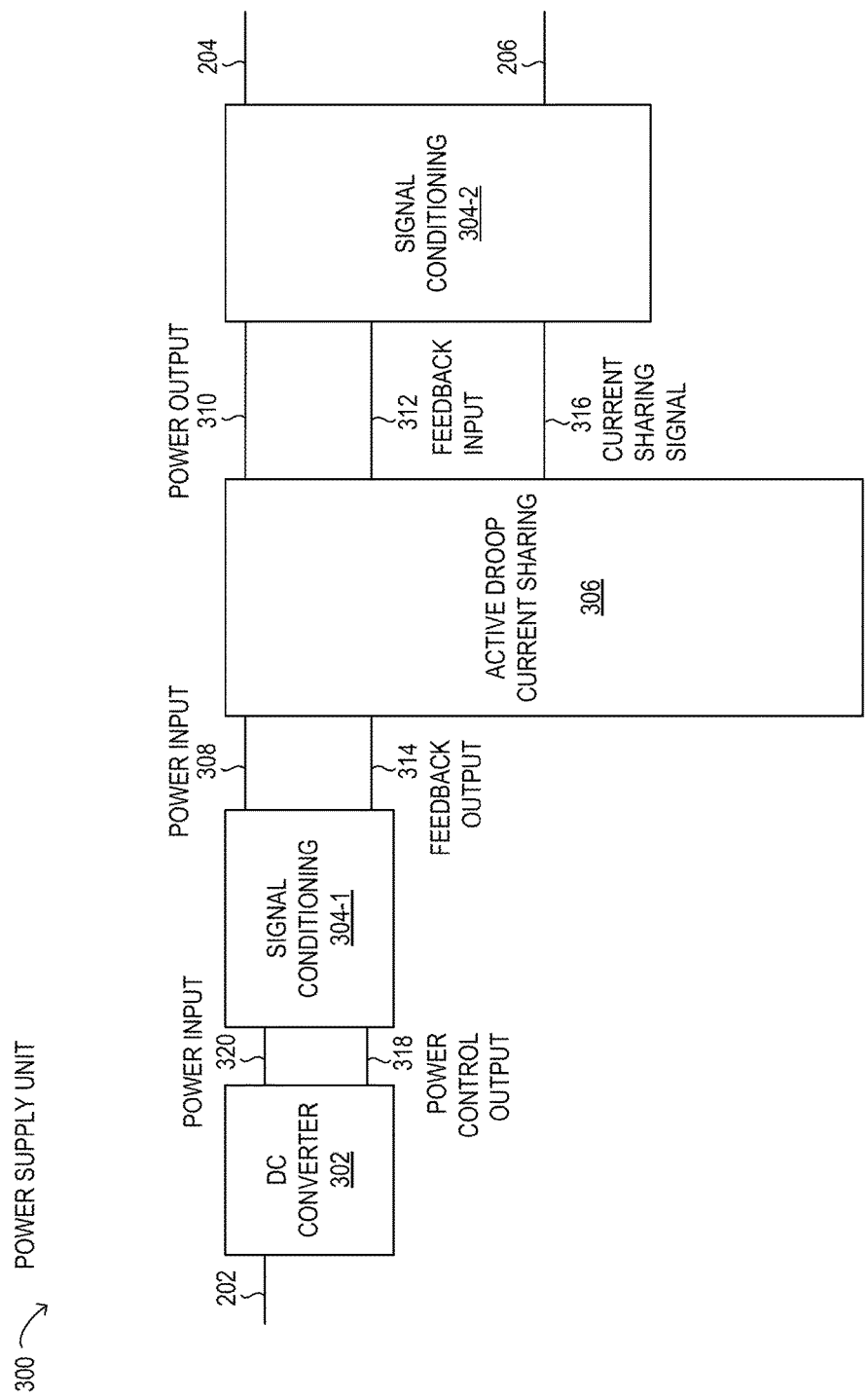
FIG. 3 is a block diagram of selected elements of an embodiment of a power supply unit.

Referring now to FIG. 3, an exemplary block diagram of selected elements of an embodiment of power supply unit 300 is illustrated. FIG. 3 is a schematic illustration and is not drawn to scale. In FIG. 3, ground connections are omitted for descriptive clarity. As shown, power supply unit 300 may represent an embodiment of power supply unit 200 described above with respect to FIGS. 2A and 2B. In FIG. 3, power supply unit 300 includes DC converter 302, signal conditioning blocks 304, and active droop current sharing 306. It is noted that in different embodiments, power supply unit 300 may include fewer or additional elements.

As shown in FIG. 3, signal conditioning block 304-1 is coupled between DC converter 302 and active droop current sharing 306. Similarly, signal conditioning block 304-2 is coupled between active droop current sharing 306 and both output power terminal 204 and current sharing terminal 206. Signal conditioning blocks 304 may represent circuitry to perform any suitable functions to manipulate input and output signals for operation of active droop current sharing 306. Specifically, signal conditioning blocks 304 may amplify, filter, buffer, regulate, upshift, downshift, monitor, clean, convert, or otherwise prepare or manipulate various signals. In given embodiments, signal conditioning blocks 304 may isolate a power supply unit, for example, by allowing current to flow in a desired direction. Signal conditioning blocks 304 may facilitate or perform analog-to-digital conversion or digital-to-analog conversion. Signal conditioning blocks 304 may include pass-through functionality for certain signals, including power signals. In some embodiments, signal conditioning blocks 304 may condition or prepare signals for downstream processing, such as by active droop current sharing 306.

In power supply unit 300, input power terminal 202 may supply power to DC converter 302 which may supply a direct current at a specified output voltage to signal conditioning block 304-1 via power input 320. Accordingly, signal conditioning block 304-1 may output power on power input 308 to active droop current sharing 306. Additionally, signal conditioning block 304-1 may receive feedback output 314 from active droop current sharing 306 and may output power control output 318 to DC converter 302, as is described in further detail with respect to FIG. 4A below.

As shown, active droop current sharing 306 receives power input 308, feedback input 312, and current sharing signal 316, and transmits power output 310, feedback output 314, and current sharing signal 316. Active droop current sharing 306 may receive power input from signal conditioning block 304-1 and may receive feedback input 312 and current sharing signal 316 from signal conditioning block 304-2. Active droop current sharing 306 may transmit power output 310 and current sharing signal 316 to signal conditioning block 304-2 and may transmit feedback output 314 to signal conditioning block 304-1. It is noted that these input and output signals are exemplary and active droop current sharing 306 may employ fewer or more connections in different embodiments.

Figure 4A:
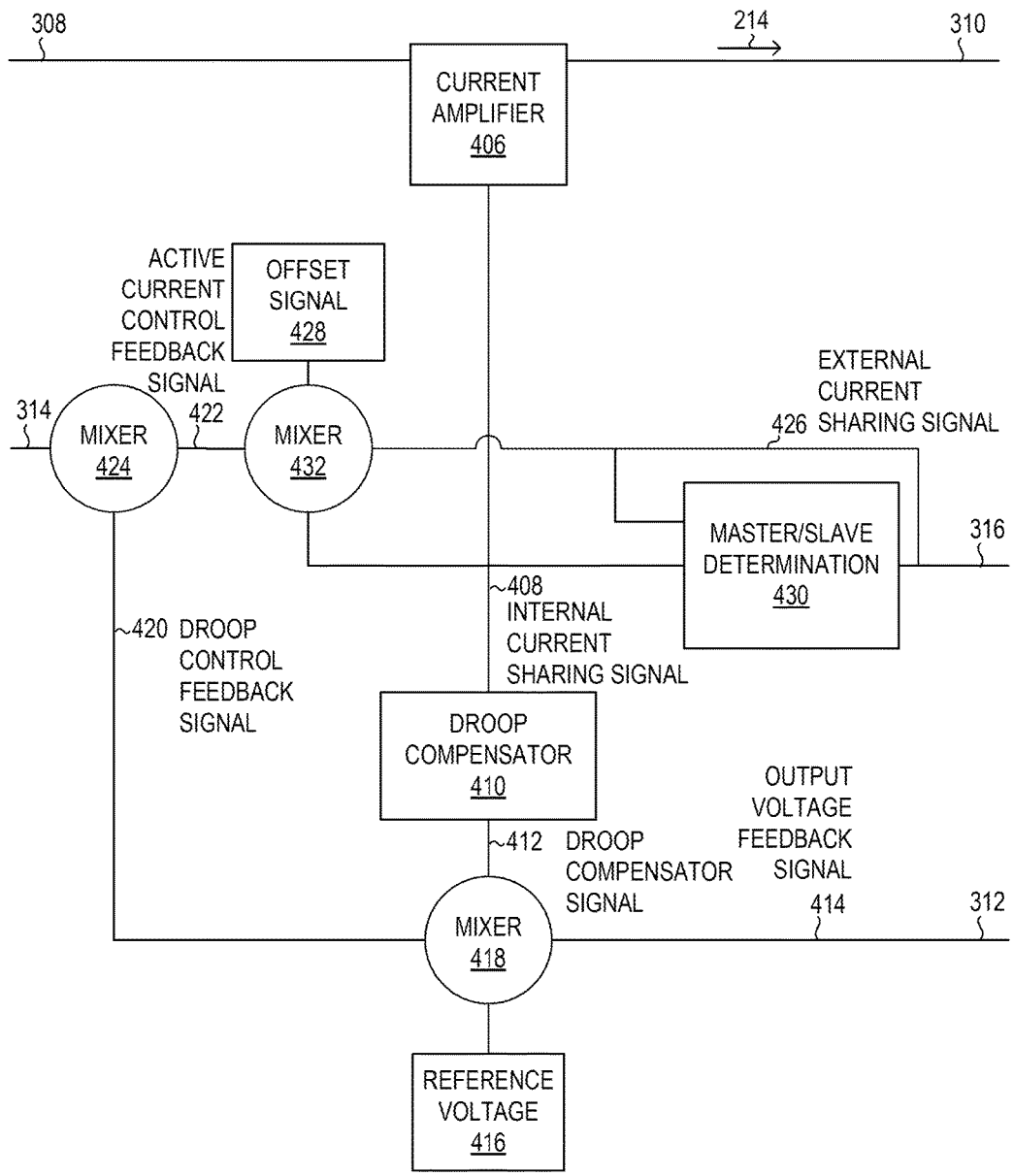
FIG. 4A is a block diagram of selected elements of an embodiment of active droop current sharing.
Figure 4B:
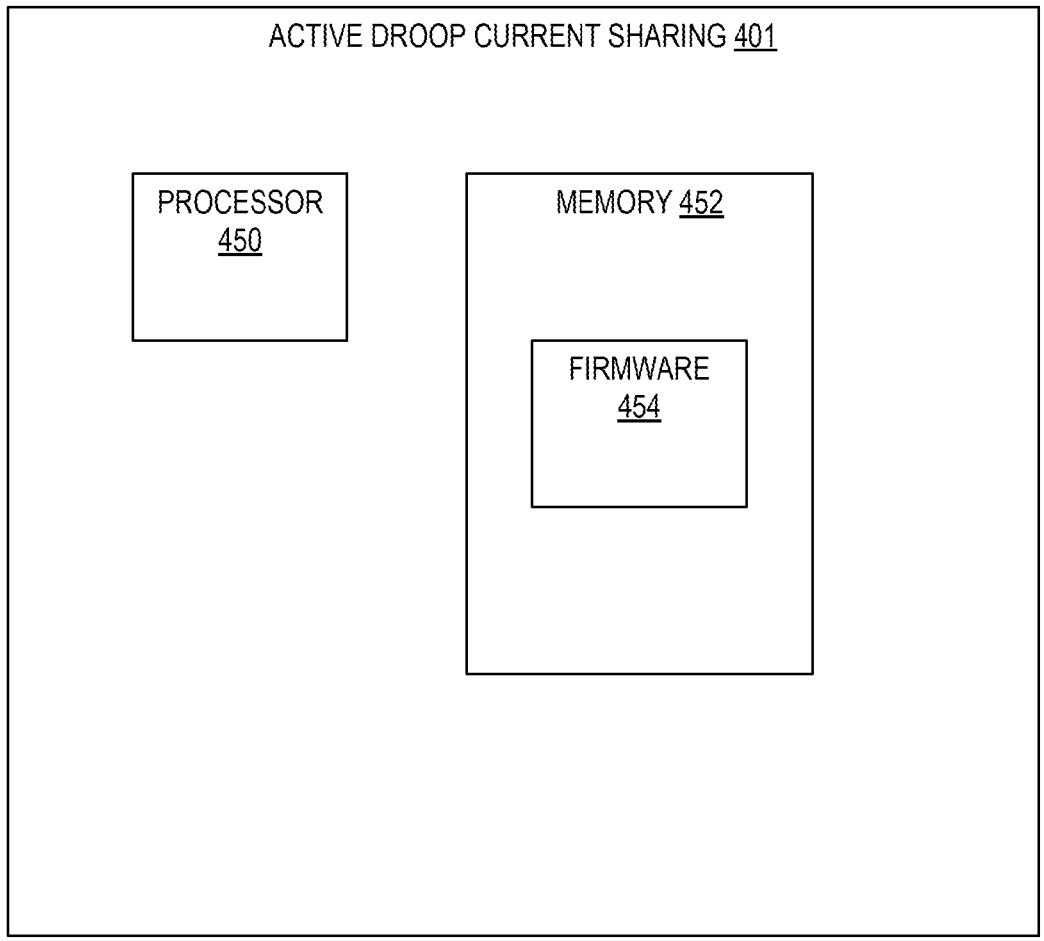
FIG. 4B is a block diagram of selected elements of an embodiment of active droop current sharing.

Active droop current sharing 306 may comprise a processor, such as a microcontroller, a digital signal controller (DSC), a digital signal processor (DSP), etc., that executes instructions stored in a computer-readable media (see also FIG. 4B). The instructions may be executable by the processor to monitor and regulate a current difference between a first output current of power supply unit 300 supplied at output power terminal 204 and a second output current of a second power supply (not shown in FIG. 3). Furthermore, active droop current sharing 306 may be implemented using electronic circuitry to monitor and regulate the current difference. The electronic circuitry may include analog circuitry or digital logic or combinations thereof to perform the monitoring and regulating of the current difference. In some embodiments, active droop current sharing 306 may include a processor and computer-readable media operating cooperatively with additional electronic circuitry to monitor and regulate the current difference to a desired value.

Thus, in various embodiments, active droop current sharing 306 may monitor, adjust, or regulate a current difference between current supplied by power supply unit 300 and current supplied by one or more other power supply units. For example, active droop current sharing 306 may regulate the current difference to correspond to a maximum threshold or a particular set point for the current difference.

As shown, signal conditioning block 304-2 receives power output 310 from active droop current sharing 306, which may be a regulated voltage and current to maintain the desired current difference. Signal conditioning block 304-2 may output the regulated voltage and current on output power terminal 204 and may output a signal indicative of the regulated voltage on feedback input 312. For example, signal conditioning block 304-2 may directly pass through the regulated voltage received on power output 310 to feedback input 312 without signal conditioning. Additionally, signal conditioning block 304-2 may handle bidirectional signals that may operate as inputs and outputs of power supply unit 300 at various times. For example, when a current supplied by power supply unit 300 is less than a current supplied by another power supply unit in a current sharing system, signal conditioning block 304-2 may input a signal on current sharing terminal 206 and may output current sharing signal 316 to active droop current sharing 306. Alternatively, when the current supplied by power supply unit 300 is greater than the current supplied by another power supply unit in a current sharing system, signal conditioning block 304-2 may receive current sharing signal 316 from active droop current sharing 306 and may output a signal on current sharing terminal 206. The bidirectional nature of current sharing signal 316 and signals on current sharing terminal 206 will be described in further detail with respect to FIG. 4A below.

Referring now to FIG. 4A, a block diagram of selected elements of an embodiment of active droop current sharing 400 is shown. FIG. 4A is a schematic illustration and is not drawn to scale. In FIG. 4A, ground connections are omitted for descriptive clarity. In FIG. 4A, active droop current sharing 400 may represent an embodiment of active droop current sharing 306 described above with respect to FIG. 3. As shown, active droop current sharing 400 receives power input 308 and feedback input 312, and may receive current sharing signal 316. Active droop current sharing 400 also transmits power output 310, feedback output 314, and may transmit current sharing signal 316. As shown, active droop current sharing 400 includes current amplifier 406, droop compensator 410, master/slave determination 430, offset signal 428, reference voltage 416, as well as mixers 418, 424, and 432. Additionally, active droop current sharing 400 is shown with external current sharing signal 426, internal current sharing signal 408, droop compensator signal 412, droop control feedback signal 420, output voltage feedback signal 414, and active current control feedback signal 422. It is noted that in different embodiments, active droop current sharing 400 may include fewer or additional elements.

As shown in FIG. 4A, active droop current sharing 400 may control a current difference between two currents respectively supplied by two power supply units, such as first current $I_1$ 214 and second current $I_2$ 216, described above with respect to FIG. 2B. Accordingly, in the following description, reference is made to power supply units 200 of current sharing system 201 (see FIG. 2B). In the following description, it will be assumed that active droop current sharing 400 is included with power supply unit 200-1 and operates to regulate first current $I_1$ 214 to match second current $I_2$ 216 (see FIG. 2B). It will be recognized that a similar active droop current sharing may be included with power supply unit 200-2 and may operate to regulate second current $I_2$ 216 to match first current $I_1$ 214.

In the embodiment shown in FIG. 4A, in operation, active droop current sharing 400 may minimize a current difference between first current $I_1$ 214 and second current $I_2$ 216. For example, in response to a switching of load 210, active droop current sharing 400 may initially activate droop control of first current $I_1$ 214. Droop control of first current I₁ 214 may modify first current I₁ 214, and may thereby reduce the current difference between first current I₁ 214 and second current I₂ 216 over time. After activating the droop control, active droop current sharing 400 may detect that first current I₁ 214 is stable within a tolerance over a time period. For example, the tolerance may be a 1% change in current and the time period may be 1 millisecond (1 ms). After active droop current sharing 400 detects that first current I₁ 214 is stable within the tolerance, active droop current sharing 400 may further detect whether the current difference between first current I₁ 214 and second current I₂ 216 is greater than a first maximum threshold. For example, the first maximum threshold may correspond to 4% of the sum of first current I₁ 214 and second current I₂ 216. If the current difference between first current I₁ 214 and second current I₂ 216 is greater than the first maximum threshold, active droop current sharing 400 may then regulate first current I₁ 214 and second current I₂ 216 using active current control to reduce the current difference to correspond to the first maximum threshold.

After detecting that the current difference between first current I₁ 214 and second current I₂ 216 corresponds to the first maximum threshold, active droop current sharing 400 may use active current control, as described in detail below, to further regulate first current I₁ 214 to maintain the current difference corresponding to the first maximum threshold for a period of time. For example, active droop current sharing 400 may use active current control to maintain the current difference until a subsequent switching of load 210. When a subsequent switching of load 210 occurs, active droop current sharing 400 may detect the subsequent switching by a change in first current I₁ 214 greater than a second maximum threshold and by a change in second current I₂ 216 greater than the second maximum threshold. It is noted that whereas the first maximum threshold corresponds to a difference between first current I₁ 214 and second current I₂ 216 at a particular time, the second maximum threshold corresponds to a change in either first current I₁ 214 or second current I₂ 216 from one particular time to another particular time. In certain embodiments, both first current I₁ 214 and second current I₂ 216 may be used to detect the switching of load 210. For example, the first maximum threshold may be 4% of the sum of first current I₁ 214 and second current I₂ 216. In one embodiment, the second maximum threshold may be greater than about 10% of either first current I₁ 214 or second current I₂ 216, respectively. Droop control and active current control of first current I₁ 214 are described in more detail below.

Active droop current sharing 400 may generate feedback output 314 to direct DC converter 302 to regulate the output voltage that DC converter 302 supplies. For example, active droop current sharing 400 may use mixer 424 to generate feedback output 314 based on Equation 1.

$$V_{out\_target} = V_{out\_actual} + V_{fb} \quad \text{Equation 1}$$

In Equation 1, $V_{out\_target}$ may represent a target output voltage that active droop current sharing 400 directs DC converter 302 to supply, $V_{out\_actual}$ may represent an actual output voltage supplied by DC converter 302 that may be modified to achieve the target output voltage, and $V_{fb}$ may represent a feedback voltage generated by active droop current sharing 400 that may be indicative of the correction to the actual output voltage that DC converter 302 may make to achieve the target output voltage. Active droop current sharing 400 may implement Equation 1 in any suitable way. For example, active droop current sharing may determine $V_{fb}$ based on a predetermined nominal voltage, by droop control of first current I₁ 214, by active current control of first current I₁ 214, by receiving a feedback signal indicative of the actual output voltage, or by any combination thereof. Active droop current sharing 400 may generate output feedback 314 to be indicative of $V_{fb}$, and may transmit output feedback 314 to DC converter 302 to direct DC converter 302 to modify the output voltage from $V_{out\_actual}$ to $V_{out\_target}$.

DC converter 302 may receive one combined feedback signal indicative of both droop control feedback and active current control feedback from active droop current sharing 400, for example, output feedback 314. Accordingly, mixer 424 may generate output feedback 314 to combine both feedback corresponding to droop control of first current I₁ 214 and feedback corresponding to active current control of first current I₁ 214. For example, mixer 424 may add droop control feedback signal 420, corresponding to droop control feedback, and active current control feedback signal 422, corresponding to active current control feedback, to generate output feedback 314. For descriptive clarity, the detailed discussion of droop control and active current control below describes droop control and active current control as independent processes, each having an uninhibited ability to direct DC converter 302 to modify the output voltage. It is noted, however, that droop control and active current control may occur simultaneously. Accordingly, for example, a direction to modify the output voltage on account of droop control by droop control feedback signal 420 may be completely or partially offset by a direction to modify the output voltage on account of active current control by active current control feedback signal 422. Similarly, a direction to modify the output voltage on account of active current control by active current control feedback signal 422 may be completely or partially offset by a direction to modify the output voltage on account of droop control by droop control feedback signal 420 in the same way.

Using droop control to adapt to changes in current may be advantageous as compared to adapting to changes in current without using droop control. For example, droop control may facilitate stabilization of first current I₁ 214, as well as stabilization of the current difference between first current I₁ 214 and second current I₂ 216. Droop control may cause first current I₁ 214 and second current I₂ 216 to stabilize at a current difference that is within a desired maximum threshold. If droop control stabilizes first current I₁ 214 and second current I₂ 216 at the current difference within the desired maximum threshold, droop control may achieve the desired equal current sharing without additional regulation of first current I₁ 214 and second current I₂ 216 using active current control. Alternatively, droop control may cause first current I₁ 214 and second current I₂ 216 to stabilize at a current difference that is greater than the desired maximum threshold. If droop control stabilizes first current I₁ 214 and second current I₂ 216 at the current difference greater than the desired maximum threshold, active droop current sharing 400 may then regulate first current I₁ 214 and second current I₂ 216 using active current control to reduce the current difference to correspond to the desired maximum threshold. Even when active current control is used in addition to droop control, however, the prior stabilization of first current I₁ 214 and the current difference between first current I₁ 214 and second current I₂ 216 performed by the droop control may ultimately result in a lower or more stable current difference.

Droop control may also facilitate current sharing by reducing transients. Without droop control, large current changes caused by a switching of a load may cause significant voltage transients that may adversely affect active current sharing. Current sharing between multiple power supply units may be more effective when each power supply unit reacts to changes without generating large transients in voltage or current. For example, when a power supply unit generates large power transients, the power supply unit may exceed a desired voltage range, and may even exceed power ratings for the power supply unit, thereby causing a safety shut down, which is undesirable. Accordingly, voltage transients in the output voltage are undesirable in a current sharing system. Using droop control, however, may mitigate voltage transients and may narrow a range of the output voltage supplied to load 210. For example, droop control may direct the output voltage at output power terminal 204 to be slightly below a nominal voltage and may change the output voltage depending on the current supplied. As a result, droop control may prevent a voltage transient in response to an abrupt current change by regulating the output voltage in a prescribed and limited manner. Additionally, droop control may be beneficial when the load is a dynamic load that oscillates at a given frequency, because, for example, droop control may exhibit an improved response to oscillating loads than active current sharing.

As shown in FIG. 4A, droop control of first current $I_1$ 214 may include current amplifier 406, droop compensator 410, droop compensator signal 412, reference voltage 416, output voltage feedback signal 414, and mixer 418 to create droop control feedback signal 420. As shown, current amplifier 406 generates internal current sharing signal 408 that may be indicative of first current $I_1$ 214 being supplied to load 210. Droop compensator 410 uses internal current sharing signal 408 to generate droop compensator signal 412 that may be indicative of a droop compensation that may be applied to the output voltage supplied by DC converter 302. Output voltage feedback signal 414 may be an input to active droop current sharing 400 indicative of the actual output voltage at output power terminal 204-1. Reference voltage 416 may be indicative of a precise nominal output voltage to be supplied at output power terminal 204-1, for example, 12.000 VDC. In some embodiments, reference voltage 416 may be generated externally to active droop current sharing 400. As shown, mixer 418 uses droop compensator signal 412, output voltage feedback signal 414, and reference voltage 416 to generate droop control feedback signal 420 for feedback to DC converter 302.

Droop compensator 410 may use internal current sharing signal 408 to determine a droop compensation that may be applied to the output voltage supplied by DC converter 302. Droop compensator 410 may generate droop compensator signal 412 based on the droop compensation determined. Droop compensator signal 412 may be an analog signal, such as a voltage, or a digital signal indicative of the droop compensation. Droop compensator 410 may generate droop compensator signal 412 to be indicative of any droop compensation suitable for a particular embodiment. For example, if first current $I_1$ 214 is supplying a relatively large portion of total load current 218, droop compensator 410 may generate droop compensator signal 412 to represent a relatively large droop compensation. Conversely, if first current $I_1$ 214 is supplying a relatively small portion of total load current 218, droop compensator 410 may generate droop compensator signal 412 to represent a relatively small droop compensation.

Mixer 418 may generate droop control feedback signal 420 to deliver feedback to DC converter 302 indicating the extent to which DC converter 302 should modify the output voltage on account of droop control. For example, mixer 418 may generate droop control feedback signal 420 to modify the output voltage according to Equation 2.

$$V_{out\_target} = V_{out\_nominal} - V_{droop\_max} * I_{out\ (\%)} \qquad \text{Equation 2}$$

In Equation 2, $V_{out\_target}$ may represent a target output voltage that incorporates a desired droop compensation determined by active droop current sharing 400, $V_{out\_nominal}$ may represent a nominal output voltage that does not incorporate the droop compensation, $V_{droop\_max}$ may represent a maximum droop compensation that active droop current sharing 400 may provide, and $I_{out\ (\%)}$ may represent a dimensionless value indicative of a percentage of total load current 218 that first current $I_1$ 214 supplies. $V_{droop\_max}$ may relate to a predetermined design parameter of active droop current sharing 400 and may be implemented in any suitable way. For example, $V_{droop\_max}$ may be 250 mVDC and may be implemented by droop compensator 410 such that droop compensation varies linearly according to the percentage of total load current 218 supplied by first current $I_1$ 214, with a maximum droop compensation of 250 mVDC when first current $I_1$ 214 supplies 100% of total load current 218. $I_{out\ (\%)}$ may thus be a dimensionless value relating to the percentage of total load current 218 supplied by first current $I_1$ 214. For example, if first current $I_1$ 214 supplies 60% of total load current 218 and second current $I_2$ 216 provides 40% of total load current 218, $I_{out\ (\%)}$ of first current $I_1$ 214 is 0.6. Thus, according to Equation 2, if a nominal output voltage of DC converter 302 is 12.0 VDC, a maximum droop compensation is 250 mVDC, and first current $I_1$ 214 is supplying 60% of total load current 218, droop control may direct DC converter 302 to supply a droop compensated output voltage of 11.85 VDC.

In order to implement droop control according to Equation 2, mixer 418 may combine droop compensator signal 412, output voltage feedback signal 414, and reference voltage 416 to generate droop control feedback signal 420 according to Equation 3.

$$V_{droop\_fb} = V_{out\_nominal} - V_{out\_actual} - (V_{droop\_max} * I_{out\ (\%)}) \qquad \text{Equation 3}$$

In Equation 3, $V_{droop\_fb}$ may represent a droop control feedback value (e.g., corresponding to droop control feedback signal 420). $V_{out\_nominal}$ may represent a nominal output voltage that does not incorporate droop compensation, such as reference voltage 416. $V_{out\_actual}$ may represent an actual voltage being supplied by DC converter 302, such as output voltage feedback signal 414. $V_{droop\_max} * I_{out\ (\%)}$ may represent a desired droop compensation based on the maximum droop compensation and the percentage of total load current 218 supplied by first current $I_1$ 214, such as given by droop compensator signal 412.

Reference is made to the example given above with respect to Equation 2, where the nominal output voltage of DC converter 302 is 12.0 VDC, maximum droop compensation is 250 mVDC, first current $I_1$ 214 supplies 60% of total load current 218, and the droop adjusted target output voltage is thus 11.85 VDC. Equation 3 implements Equation 2 by incorporating the actual output voltage to determine the feedback value to be transmitted to DC converter 302 to achieve the target output voltage of 11.85 VDC. Specifically, if $V_{out\_actual}$ is 11.92 VDC, Equation 3 implements Equation 2 by indicating that a droop control feedback $V_{droop\_fb}$ equal to −70 mVDC will result in the droop compensated target output voltage of 11.85 VDC. In various embodiments, droop control may deliver feedback to DC converter 302 using different equations, arrangements, and means.

As shown in FIG. 4A, active droop current sharing 400 may use active current control along with droop control to establish and retain a current difference between first current $I_1$ 214 and second current $I_2$ 216. Because certain operational parameters for components used to manufacture power supply units 200 may vary, small maximum thresholds of current difference may be difficult or impossible to attain using passive current control techniques, such as droop control. Accordingly, active current control may be used in addition to droop control to attain desired smaller values for the current difference between first current $I_1$ 214 and second current $I_2$ 216.

As shown in FIG. 4A, active current control may use internal current sharing signal 408, external current sharing signal 426, and offset signal 428 to generate active current control feedback signal 422. As described above in reference to droop control, internal current sharing signal 408 may be generated by current amplifier 406 to be indicative of first current $I_1$ 214 being supplied to load 210. Offset signal 428 may be indicative of a predetermined acceptable current difference such as a maximum threshold between first current $I_1$ 214 and second current $I_2$ 216. Although shown included within active droop current sharing 400, in various embodiments, offset signal 428 may be generated externally.

Active current control may operate independently or in conjunction with droop control, as described above. For example, active droop current sharing 400 may regulate first current $I_1$ 214 using active current control after detecting that first current $I_1$ 214 is stable according to a given measure. In some embodiments, the measure of a stable current is when the current is within a tolerance of 1% over a time period of 1 millisecond. In addition to detecting that first current $I_1$ 214 is stable, active droop current sharing may detect that a current difference between first current $I_1$ 214 and second current $I_2$ 216 is greater than a first maximum threshold. In particular embodiments, the first maximum threshold may be given as a percentage (e.g., 4%) of a sum of first current $I_1$ 214 and second current $I_2$ 216. In certain embodiments, detecting the stabilization of first current $I_1$ 214 may be performed by sampling first current $I_1$ 214 over a given time interval (e.g., 1 millisecond) and determining that first current $I_1$ 214 does not vary in excess of a predetermined amount (e.g., ±1%) during the time interval. Using active current control, active droop current sharing 400 may then regulate first current $I_1$ 214 to reduce the current difference between first current $I_1$ 214 and second current $I_2$ 216 to correspond to the first maximum threshold.

Active droop current sharing 400 may use active current control to regulate first current $I_1$ 214 and second current $I_2$ 216 in any suitable way. For example, active droop current sharing 400 may base the active current control on whether power supply unit 200-1 corresponds to "master" or to "slave" in a current sharing system. When power supply unit 200-1 corresponds to slave, active droop current sharing 400 may direct operation of the shared current control and may direct DC converter 302 to supply a slightly larger share of total load current 218 supplied to load 210 than supplied by power supply units that correspond to slave (e.g., power supply unit 200-2). Conversely, when power supply unit 200-1 corresponds to master, active droop current sharing 400 may respond to actions by another power supply unit that corresponds to slave (e.g., power supply unit 200-2). When first current $I_1$ 214 is greater than second current $I_2$ 216, power supply unit 200-1 may correspond to master and active droop current sharing 400 may regulate first current $I_1$ 214 by transmitting feedback that the output voltage supplied by DC converter 302 may be maintained at a fixed voltage. Conversely, when first current $I_1$ 214 is less than second current $I_2$ 216, power supply unit 200-1 may correspond to slave and active droop current sharing 400 may regulate first current $I_1$ 214 by transmitting feedback that the output voltage supplied by DC converter 302 may be modified so as to increase first current $I_1$ 214. It will be recognized that as an output current from a power supply unit corresponding to slave increases, an output current from a power supply unit corresponding to master may decrease as long as total load current 218 supplied to load 210 remains constant. As a power supply unit corresponding to slave supplies increasing current while a power supply unit corresponding to master supplies decreasing current, each power supply unit may come closer to supplying an equal share of total load current 218 and a current difference between the power supply units may decrease, which may be desirable for current sharing, as noted above.

External current sharing signal 426 may be generated by master/slave determination 430 when power supply unit 200-1 corresponds to master, or received (e.g., from power supply unit 200-2) when power supply unit 200-1 corresponds to slave. External current sharing signal 426 may be indicative of a current being supplied by a power supply unit corresponding to master. Thus, external current sharing signal 426 may be indicative of the greater current of first current $I_1$ 214 and second current $I_2$ 216.

Master/slave determination 430 may generate or receive current sharing signal 316 and external current sharing signal 426 in any suitable way. For example, master/slave determination 430 may comprise a comparator for comparing internal current sharing signal 408 to external current sharing signal 426. Master/slave determination 430 may also comprise circuitry to emulate an ideal diode, allowing current sharing signal 316 to act as an output when master and as an input when slave. For example, when power supply unit 200-1 corresponds to master, master/slave determination 430 may transmit current sharing signal 316 to be indicative of first current $I_1$ 214 because first current $I_1$ 214 is greater than second current $I_2$ 216, making the ideal diode forward biased. External current sharing signal 426 may also be indicative of first current $I_1$ 214, because external current sharing signal 426 is directly coupled to current sharing signal 316. Conversely, when power supply unit 200-1 corresponds to slave, master/slave determination 430 may not be able to transmit current sharing signal 316 because first current $I_1$ 214 is less than second current $I_2$ 216, making the ideal diode reverse biased. In this case, master slave determination 430 may output nothing onto current sharing signal 316 and current sharing signal 316 may instead act as an input indicative of second current $I_2$ 216. As noted, external current sharing signal 426 may also be indicative of second current $I_2$ 216 because external current sharing signal 426 is directly coupled to current sharing signal 316.

Mixer 432 may combine internal current sharing signal 408, external current sharing signal 426, and offset signal 428 in any suitable way to generate active current control feedback signal 422. For example, mixer 432 may combine internal current sharing signal 408, external current sharing signal 426, and offset signal 428 to implement Equation 4.

$$V_{active\_fb} = V_{ext} - V_{int} - V_{offset} \quad \text{Equation 4}$$

In Equation 4, $V_{active\_fb}$ may represent an active current control feedback value, such as active current control feedback signal 422. $V_{ext}$ may represent an external current sharing value indicative of the current being supplied by the power supply unit corresponding to master, such as external current sharing signal 426. $V_{int}$ may represent an internal current sharing value indicative of first current $I_1$ 214 and may correspond to internal current sharing signal 408. $V_{offset}$ may represent an offset value indicative of a desired maximum threshold, and may correspond to offset signal 428.

Thus, in an example where power supply unit 200-1 corresponds to slave, $V_{ext}$ may be indicative of second current $I_2$ 216 and may be greater than $V_{int}$, which is indicative of first current $I_1$ 214. $V_{ext}-V_{int}$ thus may represent a positive current difference greater than zero between first current $I_1$ 214 and second current $I_2$ 216. $V_{text}-V_{int}$ may be less than $V_{offset}$, signifying that the current difference is already within the desired maximum threshold. According to Equation 4, when $V_{ext}-V_{int}$ is less than $V_{offset}$, $V_{active\_fb}$ may be less than or equal to zero. A zero or negative value of $V_{active\_fb}$ may indicate to DC converter 302 that the output voltage may be acceptable without modification on account of active current control. Thus, DC converter 302 may regulate first current $I_1$ 214 using active current control to maintain the current difference corresponding to the desired maximum threshold by maintaining the output voltage at a fixed level. In this example, it is noted that the output voltage is maintained not because power supply unit 200-1 corresponds to master or slave, but because the current difference is already less than or equal to the desired maximum threshold. Conversely, $V_{ext}-V_{int}$ may be greater than $V_{offset}$, signifying that the current difference is greater than the desired maximum threshold. According to Equation 4, when $V_{ext}-V_{int}$ is greater than $V_{offset}$, $V_{active\_fb}$ may be greater than zero. A positive value of $V_{active\_fb}$ may indicate to DC converter 302 that the output voltage may be insufficient without modification on account of current control. Thus DC converter 302 may regulate first current $I_1$ 214 using active current control to reduce the current difference to correspond to the desired maximum threshold by modifying the output voltage. It is noted that a value of $V_{active\_fb}$ may be additionally amplified to obtain a desired response time that is shorter than without additional amplification.

In another example where power supply unit 200-1 corresponds to master, $V_{ext}$ may be indicative of first current $I_1$ 214 and may thus be identical to $V_{int}$, which is also indicative of first current $I_1$ 214. Here, $V_{ext}-V_{int}$ is zero because $V_{ext}$ and $V_{int}$ represent the same current. According to Equation 4, $V_{active\_fb}$ may thus be less than or equal to zero, indicating to DC converter 302 that the output voltage may be acceptable without modification on account of active current control. Thus, DC converter 302 may regulate first current $I_1$ 214 using active current control to reduce the current difference to correspond to the desired maximum threshold by maintaining the output voltage at a fixed level. In this example, it is noted that the output voltage is maintained not because the current difference already corresponds to the desired maximum threshold, but because power supply unit 200-1 corresponds to master, and first current $I_1$ 214 is thus expected to be modified as a consequence of power supply unit 200-2 regulating second current $I_2$ 216.

Referring now to FIG. 4B, a block diagram of selected elements of active droop current sharing 401 is illustrated. FIG. 4B is a schematic illustration and is not drawn to scale. In FIG. 4B, active droop current sharing 401 may represent an embodiment of active current droop sharing 400 described above with respect to FIG. 4A. As shown, active droop current sharing 401 includes processor 450, which may represent any type of processor, such as a microcontroller, a digital signal controller (DSC), a digital signal processor (DSP), etc. Processor 450 has access to memory 452, which may represent computer-readable memory media. Memory 452 may encompass persistent and volatile media, fixed and removable media, and magnetic and semiconductor media, among others. Memory 452 is operable to store instructions, data, or both. Memory 452 may include or store sets or sequences of instructions executable by processor 450, as well as other information, such as data related to active droop current sharing, as disclosed herein. As shown, memory 452 stores firmware 454, which may represent executable instructions to implement at least a portion of the functionality described herein with respect to active droop current sharing, such as active droop current sharing 400 in FIG. 4A.

Figure 5:
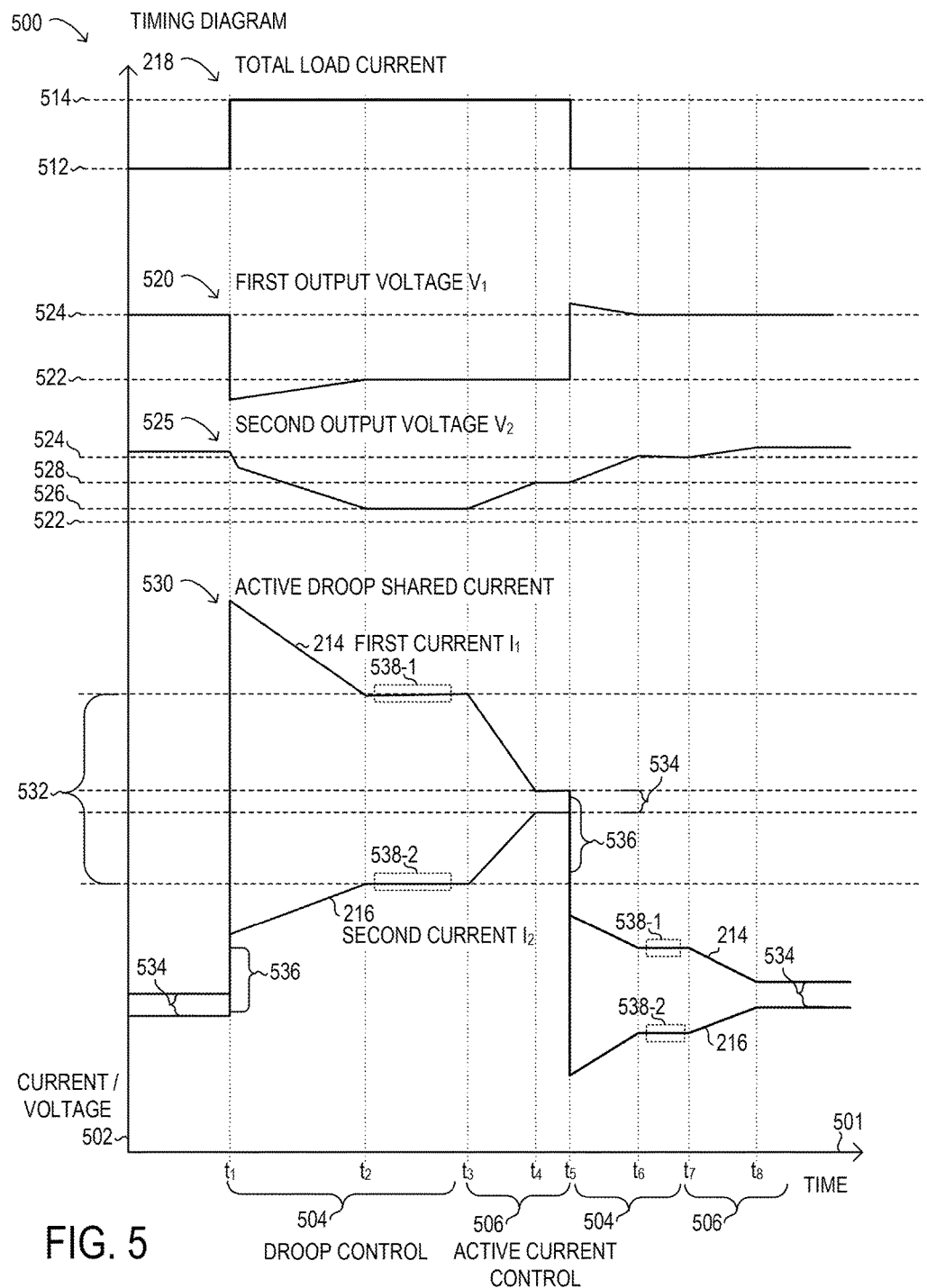
FIG. 5 is a block diagram of selected elements of an embodiment of a timing diagram of active droop current sharing.

Referring now to FIG. 5, selected elements of an embodiment of timing diagram 500 are shown. Timing diagram 500 includes a time scale on X axis 501 and a voltage/current scale on Y axis 502. It is noted that Y axis 502 is depicted with relative values for each respective timing plot, including total load current 218, first output voltage $V_1$ 520, second output voltage $V_2$ 525, and active droop shared current 530 comprising first current $I_1$ 214 and second current $I_2$ 216, while X axis 501 is common to timing diagram 500. Like element numbers with respect to Y axis 502 indicate equal values.

In timing diagram 500, voltage and current responses of current sharing system 201 to switching of load 210 (see FIG. 2B) versus time are illustrated. Accordingly, in timing diagram 500, first output voltage $V_1$ 520 and first current $I_1$ 214 correspond to power supply unit 200-1, while second output voltage $V_2$ 525 and second current $I_2$ 216 correspond to power supply unit 200-2. As shown, prior to time $t_1$, total load current 218 is at low value 512, first output voltage $V_1$ 520 is at value 524 while second output voltage $V_2$ 525 is slightly above value 524. It is noted that first output voltage $V_1$ 520 and second output voltage $V_2$ 525 may be at similar or equal values prior to time $t_1$. In timing diagram 500, second output voltage $V_2$ 525 is illustrated as being slightly greater than output voltage $V_1$ 520 indicating that second output voltage $V_2$ 525 may be regulated prior to time $t_1$, for example as a result of active current control occurring before time $t_1$.

Prior to time $t_1$, active droop shared current 530 indicates that both first current $I_1$ 214 and second current $I_2$ 216 are at a low value. Because first current $I_1$ 214 is higher than second current $I_2$ 216 in this example, power supply unit 200-1 corresponds to master. Accordingly, because second current $I_2$ 216 is less than first current $I_1$ 214, power supply unit 200-2 corresponds to slave. As described above in reference to first output voltage $V_1$ 520 and second output voltage $V_2$ 525, first current $I_1$ 214 and second current $I_2$ 216 may be at similar or equal values prior to time $t_1$ but are illustrated as being slightly different to indicate that first current $I_1$ 214 and second current $I_2$ 216 may be regulated prior to time $t_1$. For example, prior to time $t_1$, first current $I_1$ 214 and second current $I_2$ 216 may be regulated such that the current difference between first current $I_1$ 214 and second current $I_2$ 216 corresponds to first maximum threshold 534, as shown. Alternatively, first current $I_1$ 214 and second current $I_2$ 216 may both correspond to zero current, for example, when load 210 is powered down and drawing no current. When first current $I_1$ 214 and second current $I_2$ 216 both correspond to zero current, the current difference between first current $I_1$ 214 and second current $I_2$ 216 is likewise zero (not shown).

At time $t_1$, load 210 switches, causing total load current 218 to transition from low value 512 to high value 514. Low value 512 and high value 514 correspond to values for total load current 218 supplied to load 210. Low value 512 may correspond to any current level supplied to load 210 that is lower than high value 514. For example, low value 512 may correspond to a current supplied to load 210 when load 210 is in a low-power state and high value 514 may correspond to a current supplied to load 210 when load 210 is in a higher-power state. In some embodiments, low value 512 may correspond to zero current, for example, when load 210 is powered down, while high value 514 may correspond to a nominal current supplied to load 210, for example, when load 210 is powered on.

Thus, as shown at time $t_1$, total load current 218 increases to high value 514, first current $I_1$ 214 rapidly increases by more than second maximum threshold 536, and second current $I_2$ 216 also rapidly increases by more than second maximum threshold 536. Also at time $t_1$, first output voltage $V_1$ 520 and second output voltage $V_2$ 525 change in response to the increase in total load current 218 supplied to load 210. For example, first output voltage $V_1$ 520 may rapidly decrease as first current $I_1$ 214 rapidly increases, and second output voltage $V_2$ 525 may rapidly decrease as second current $I_2$ 216 rapidly increases. It is noted that although the changes to first output voltage $V_1$ 520, second output voltage $V_2$ 525, first current $I_1$ 214, and second current $I_2$ 216 are shown to occur at time $t_1$, the changes may occur over a relatively short period of time around time $t_1$.

At or after time $t_1$, the switching of load 210 may be detected from the change in first current $I_1$ 214 greater than second maximum threshold 536 and from the change in second current $I_2$ 216 greater than second maximum threshold 536. In response, each power supply unit may activate droop control 504, causing first output voltage $V_1$ 520 to gradually increase and causing second output voltage $V_2$ 525 to gradually decrease, as described above in relation to droop control. At time $t_2$, first output voltage $V_1$ 520 may have increased to regulated voltage 522. At time $t_2$, second output voltage $V_2$ 525 may have decreased to regulated voltage 526, which is slightly higher than regulated voltage 522. As droop control 504 adjusts first output voltage $V_1$ 520 and second output voltage $V_2$ 525 between time $t_1$ and $t_2$, droop control 504 also affects first current $I_1$ 214 and second current $I_2$ 216. As shown, droop control may modify first current $I_1$ 214 and second current $I_2$ 216 to be more nearly equal by decreasing first current $I_1$ 214 and increasing second current $I_2$ 216. It is noted that the change in first current $I_1$ 214 and second current $I_2$ 216 between time $t_1$ and time $t_2$ corresponds to the decrease in first output voltage $V_1$ 520 and second output voltage $V_2$ 525 during droop control 504. At time $t_2$, the current difference between first current $I_1$ 214 and second current $I_2$ 216 may correspond to current difference 532, which may be greater than maximum threshold 534.

After initially modifying first output voltage $V_1$ 520, second output voltage $V_2$ 525, first output current $I_1$ 214, and second output current $I_2$ 216 as described above, droop control 504 may cause first output current $I_1$ 214, and second output current $I_2$ 216 to stabilize within a certain tolerance over a time period. For example, after time $t_2$, power supply unit 200-1 may monitor first current $I_1$ 214 while power supply unit 200-2 may monitor second current $I_2$ 216. By time $t_3$, power supply unit 200-1 may detect that first current $I_1$ 214 has stabilized within tolerance 538-1. For example, power supply unit 200-1 may detect that first current $I_1$ 214 has changed less than 1% over a time period of 1 ms. Also at time $t_3$, slave power supply unit 200-2 may detect that second current $I_2$ 216 has stabilized within tolerance 538-2. For example, power supply unit 200-2 may detect that second current $I_2$ 216 has changed less than 1% over a time period of 1 ms. It is noted that change percentages and time periods embodied by tolerances 538-1 and 538-2 may vary in different embodiments and may vary one to another.

After first current $I_1$ 214 and second current $I_2$ 216 have both been detected to be stable within respective tolerances 538 at time $t_3$, the current difference between first current $I_1$ 214 and second current $I_2$ 216 is current difference 532. When current difference 532 is greater than first maximum threshold 534, first current $I_1$ 214 and second current $I_2$ 216 may be regulated using active current control 506 to further reduce the current difference to be within first maximum threshold 534. Specifically, because power supply unit 200-1 corresponds to master, power supply unit 200-1 may maintain first output voltage $V_1$ 520 at regulated voltage 522, the voltage attained by droop control 504. Meanwhile, because power supply unit 200-2 corresponds to slave, power supply unit 200-2 may increase second output voltage $V_2$ 525 from regulated voltage 526 to regulated voltage 528 at time $t_4$. It is noted that the roles of master and slave may be reversed in different implementations or operational conditions. Thus, between time $t_3$ and time $t_4$, first output voltage $V_1$ 520 remains constant while second output voltage $V_2$ 525 increases. Correspondingly, between time $t_3$ and time $t_4$, second current $I_2$ 216 increases as second output voltage $V_2$ 525 increases, and first current $I_1$ 214 decreases because second current $I_2$ 216 provides a greater portion of total load current 218, which remains constant between time $t_3$ and time $t_4$. At time $t_4$, the current difference may correspond to first maximum threshold 534, which is smaller than current difference 532. Thus, having attained the desired goal of first maximum threshold 534, first current $I_1$ 214 and second current $I_2$ 216 may continue to be regulated using active current control 506 to maintain the current difference between first current $I_1$ 214 and second current $I_2$ 216 corresponding to first maximum threshold 534 as long as total load current 218 remains at or near high value 514.

Then, at time $t_5$, load 210 is subsequently switched again, causing total load current to transition from high value 514 back to low value 512. Just as with the switching of load 210 at time $t_1$, the switching of load 210 at time $t_5$ may cause first current $I_1$ 214 and second current $I_2$ 216 to rapidly increase by more than second maximum threshold 536. The switching of load 210 may also cause first output voltage $V_1$ 520 and second output voltage $V_2$ 525 to rapidly change in response. Accordingly, each power supply unit may detect the change in first current $I_1$ 214 or second current $I_2$ 216, respectively, greater than second maximum threshold 536 and may activate droop control 504 of first current $I_1$ 214 and second current $I_2$ 216. At time $t_6$, droop control 504 may cause first current $I_1$ 214 and second current $I_2$ 216 to stabilize and power supply units 200-1 and 200-2 may monitor first current $I_1$ 214 and second current $I_2$ 216 for stability within respective tolerances 538-1 and 538-2. By time $t_7$, power supply units 200-1 and 200-2 may detect that first current $I_1$ 214 and second current $I_2$ 216 are stable within tolerances 538-1 and 538-2. At time $t_7$, if the current difference between first current $I_1$ 214 and second current $I_2$ 216 is greater than first maximum threshold 534, power supply units 200-1 and 200-2 may regulate first current $I_1$ 214 and second current $I_2$ 216 using active current control 506 in a like manner as between times $t_3$ and $t_4$. As between times $t_3$ and $t_4$, active current control 506 may again reduce the current difference to correspond to first maximum threshold 534 by time $t_8$. Having again attained a current difference between first current $I_1$ 214 and second current $I_2$ 216 corresponding to first maximum threshold 534, active current control 506 may continue to regulate first current $I_1$

214 and second current $I_2$ 216 to maintain the current difference as long as total load current 218 remains at or near low value 512.

Figure 6:
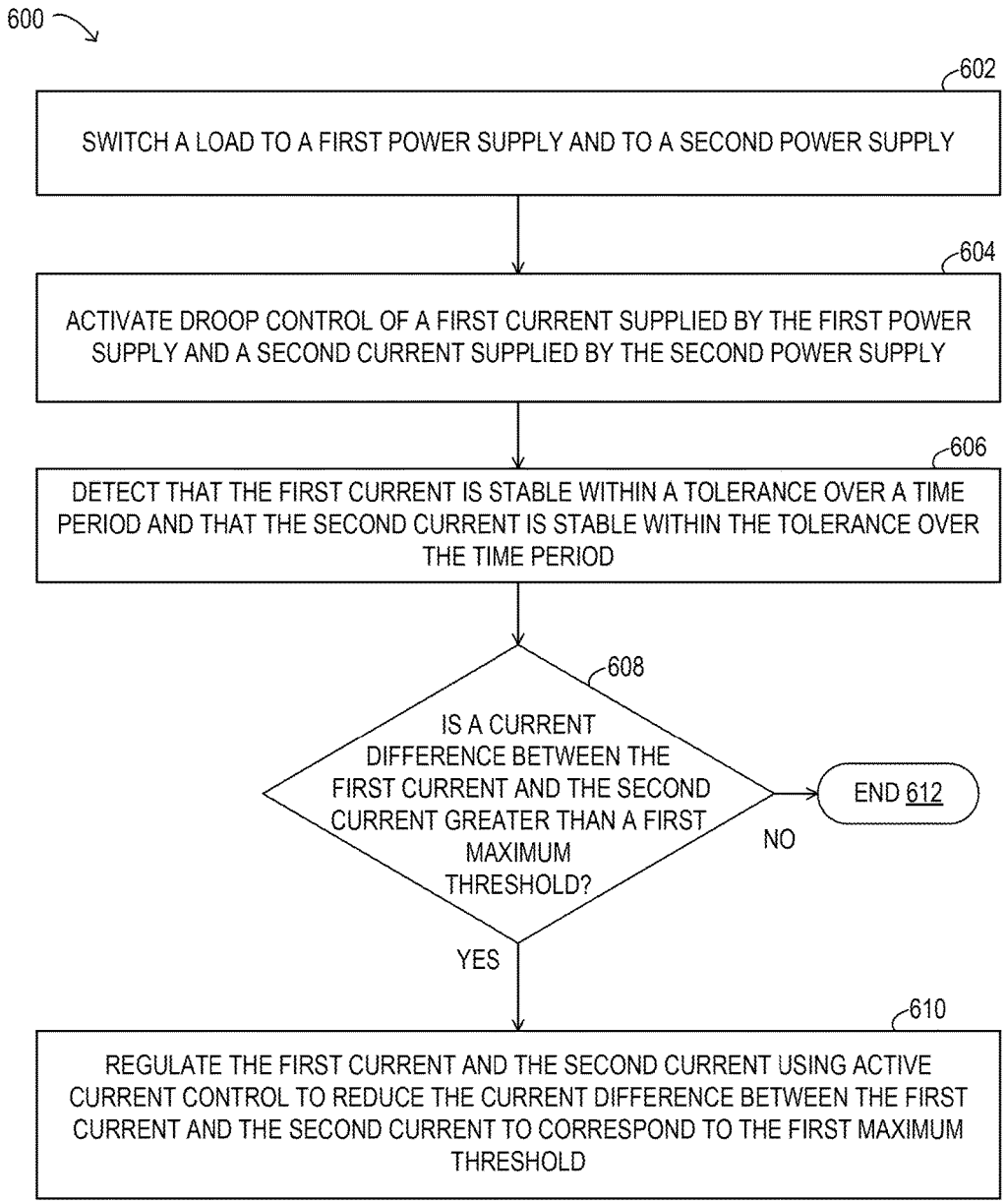
FIG. 6 is a flow chart depicting selected elements of an embodiment of a method for active droop current sharing.

Turning now to FIG. 6, a block diagram of selected elements of an embodiment of method 600 for active droop current sharing is depicted in flowchart form. Method 600 may be performed using active droop current sharing 306, 400, 401 (see FIGS. 3, 4A, 4B). It is noted that certain operations described in method 600 may be optional or may be rearranged in different embodiments.

Method 600 may begin by switching (operation 602) a load to a first power supply and to a second power supply. Then, method 600 may activate (operation 604) droop control of a first current supplied by the first power supply and a second current supplied by the second power supply. Next, method 600 may detect (operation 606) the first current is stable within a tolerance over a time period and that the second current is stable within the tolerance over the time period. Next, method 600 may determine (operation 608) if a current difference between the first current and the second current is greater than a first maximum threshold. Then, if method 600 determines that the current difference is greater than the first maximum threshold, method 600 may regulate (operation 610) the first current and the second current using active current control to reduce the current difference between the first current and the second current to correspond to the first maximum threshold. Otherwise, if method 600 determines that the current difference is not greater than the first maximum threshold, method 600 may end (operation 612).

As disclosed herein, active droop current sharing among power supply units may regulate output currents of power supply units supplying shared current to a common load. The regulation may perform equal current sharing by employing a combination of droop control and active current control. The shared current may be regulated such that each power supply unit provides a substantially equal share of the total current supplied. Accordingly, a current difference between two power supplies may be regulated to be within a desired maximum threshold for current difference.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for active droop current sharing, the method comprising:
   responsive to switching a load to a first power supply and to switching the load to a second power supply, activating droop control of a first current supplied by the first power supply and a second current supplied by the second power supply;
   detecting that the first current is stable within a tolerance over a time period and that the second current is stable within the tolerance over the time period; and
   responsive to detecting that the first current and the second current are stable and that a current difference between the first current and the second current is greater than a first maximum threshold, regulating the first current and the second current using active current control to reduce the current difference to correspond to the first maximum threshold.

2. The method of claim 1, wherein the first maximum threshold corresponds to 4% of a sum of the first current and the second current, the tolerance is a 1% change in current, and the time period is 1 millisecond.

3. The method of claim 1, wherein the switching of the load is detected from a change in the first current greater than a second maximum threshold or a change in the second current greater than the second maximum threshold.

4. The method of claim 1, wherein regulating the first current and the second current comprises:
   responsive to regulating the first current and the second current to reduce the current difference to correspond to the first maximum threshold, further regulating the first current and the second current using active current control to maintain the current difference corresponding to the first maximum threshold.

5. The method of claim 1, wherein regulating the first current and the second current comprises:
   when the first current is greater than the second current, outputting an external current sharing signal indicative of the first current from the first power supply to the second power supply.

6. The method of claim 5, wherein regulating the first current and the second current further comprises:
   based on the external current sharing signal indicative of the first current, based on a first internal current sharing signal indicative of the first current, and based on a first offset signal, generating a first active current control feedback signal by the first power supply, the first active current control feedback signal being associated with the active current control of the first current;
   based on the external current sharing signal indicative of the first current, based on a second internal current sharing signal indicative of the second current, and based on a second offset signal, generating a second active current control feedback signal by the second power supply, the second active current control feedback signal being associated with the active current control of the second current;
   based on a first droop control signal indicative of the first current, based on a first output voltage of the first power supply, and based on a first reference voltage, generating a first droop control feedback signal by the first power supply, the first droop control feedback signal being associated with the droop control of the first current; and
   based on a second droop control signal indicative of the second current, based on a second output voltage of the second power supply, and based on a second reference voltage, generating a second droop control feedback signal by the second power supply, the second droop control feedback signal being associated with the droop control of the second current.

7. The method of claim 6, wherein regulating the first current and the second current further comprises:
   based on the first active current control feedback signal and the first droop control feedback signal, generating the first output voltage of the first power supply; and
   based on the second active current control feedback signal and the second droop control feedback signal, generating the second output voltage of the second power supply;
   wherein the first active current control feedback signal is associated with maintaining the first output voltage and the second active current control feedback signal is associated with modifying the second output voltage.

8. A power supply unit comprising:
a first direct current (DC) power converter supplying a first current at an output voltage;
a first mixer to generate an active current control feedback signal associated with active current control of the first current;
a second mixer to generate a droop control feedback signal associated with droop control of the first current; and
a master/slave determination unit to:
when the first current is greater than a second current supplied by a second DC power converter, generate an external current sharing signal indicative of the first current; and
when the first current is less than the second current, receive an external current sharing signal indicative of the second current,
wherein the power supply unit is to:
activate the droop control of the first current in response to switching a load to the power supply unit,
detect that the first current is stable within a tolerance over a time period, and
in response to detecting that the first current is stable, regulate the first current using the active current control to reduce a current difference between the first current and the second current to correspond to a first maximum threshold.

9. The power supply unit of claim 8, wherein:
the active current control feedback signal is based on the external current sharing signal indicative of one of the first current and the second current, an internal current sharing signal indicative of the first current, and an offset signal; and
the droop control feedback signal is based on a droop control signal indicative of the first current, the output voltage, and a reference voltage.

10. The power supply unit of claim 8, wherein the first current is greater than the second current and the active current control feedback signal is associated with maintaining the output voltage.

11. The power supply unit of claim 8, wherein the first current is less than the second current and the active current control feedback signal is associated with modifying the output voltage.

12. The power supply unit of claim 8, further comprising:
a third mixer to generate an active droop feedback signal based on the active current control feedback signal and the droop control feedback signal,
wherein the first DC power converter supplies the first current at the output voltage based on the active droop feedback signal.

13. The power supply unit of claim 8, wherein the power supply unit is further to regulate the first current using the active current control to maintain the current difference corresponding to the first maximum threshold.

14. The power supply unit of claim 8, wherein the switching of the load is detected from a change in the second current greater than a second maximum threshold.

15. A power supply unit, comprising:
a first direct current (DC) power converter supplying a first current to a load at a first output voltage; and
a processor having access to a memory storing instructions executable by the processor to:
activate droop control of the first current in response to switching a load to the power supply unit;
generate an active current control feedback signal associated with active current control of the first current;
generate a droop control feedback signal associated with droop control of the first current;
when the first current is greater than a second current supplied by a second DC power converter, generate an external current sharing signal indicative of the first current;
when the first current is less than the second current, receive an external current sharing signal indicative of the second current;
detect that the first current is stable within a tolerance over a time period; and
in response to detecting that the first current is stable, regulate the first current using the active current control to reduce a current difference between the first current and the second current to correspond to a maximum threshold.

16. The power supply unit of claim 15, wherein:
the active current control feedback signal is based on the external current sharing signal indicative of one of the first current and the second current, an internal current sharing signal indicative of the first current, and an offset signal; and
the droop control feedback signal is based on a droop control signal indicative of the first current, the output voltage, and a reference voltage.

17. The power supply unit of claim 15, wherein the first current is greater than the second current and the active current control feedback signal is associated with maintaining the output voltage.

18. The power supply unit of claim 15, wherein the first current is less than the second current and the active current control feedback signal is associated with modifying the output voltage.

19. The power supply unit of claim 15, wherein the instructions include instructions to:
generate an active droop feedback signal based on the active current control feedback signal and the droop control feedback signal,
wherein the first DC power converter supplies the first current at the output voltage based on the active droop feedback signal.

20. The power supply unit of claim 15, wherein the power supply unit is further to regulate the first current using the active current control to maintain the current difference corresponding to the maximum threshold.

* * * * *